Oct. 15, 1968  R. NEUSCHOTZ  3,405,596
SELF-TAPPING THREADED PART
Filed Nov. 28, 1966
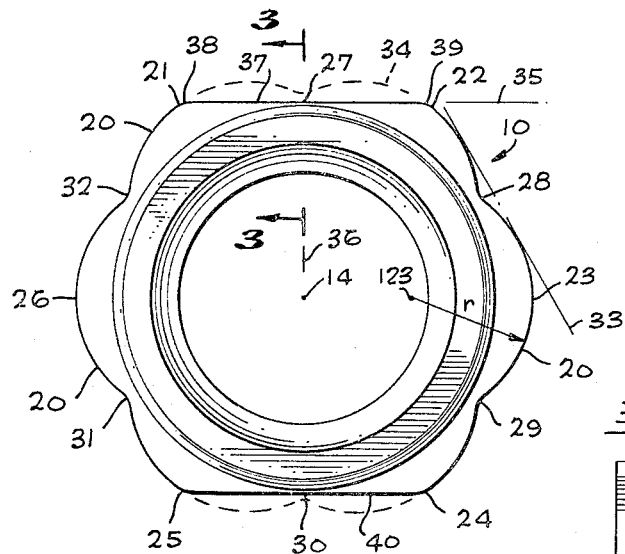
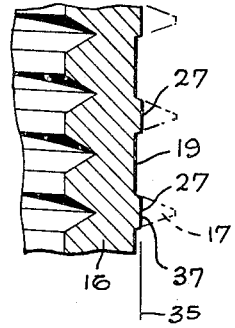
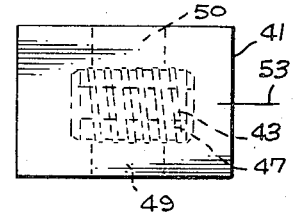
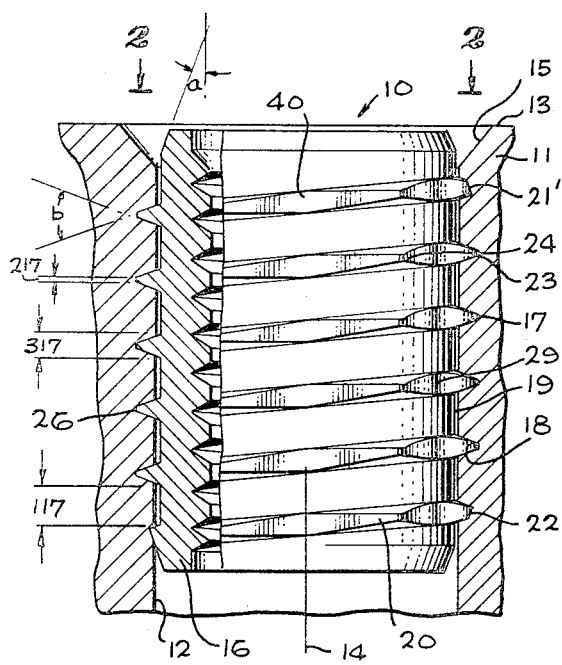
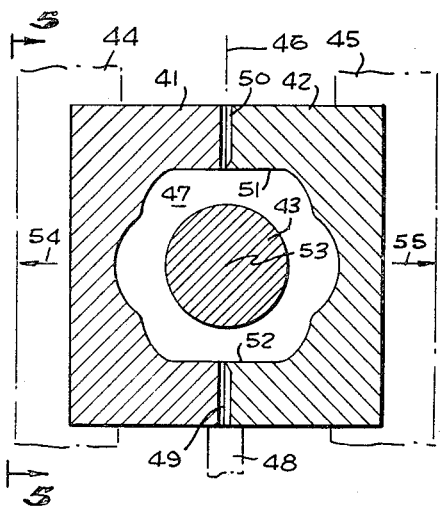
INVENTOR.
ROBERT NEUSCHOTZ
BY William P. Green
ATTORNEY

United States Patent Office 3,405,596
Patented Oct. 15, 1968

3,405,596
SELF-TAPPING THREADED PART
Robert Neuschotz, 1162 Angelo Drive,
Beverly Hills, Calif. 90210
Filed Nov. 28, 1966, Ser. No. 597,327
8 Claims. (Cl. 85—47)

ABSTRACT OF THE DISCLOSURE

A self-tapping and self-locking element having external threads to be schewed into a carrier member, with the threads having radially outer surfaces defining radially outwardly projecting circularly spaced peaks and circularly intermediate minimum radius regions. Different ones of the minimum radius regions are formed differently, so that preferably some of these regions are recessed radially inwardly beyond planes drawn to just touch their two adjacent peaks, while two other minimum radius regions, at two diametrically opposite locations, preferably form flat surfaces which are unrecessed with respect to and extend along such planes drawn to just touch their two adjacent peaks.

---

This invention relates to improvements in threaded fasteners of the general type disclosed and claimed in my United States Patent No. 3,200,691, issued August 17, 1965.

In my above identified prior patent, I have shown a fastener having external threads of a unique character capable of attaining both a self tapping and self locking action. That is, these threads when screwed into an initially unthreaded bore in a coacting carrier part are capable of forming mating threads within that bore during the process of installation, and additionally will automatically provide a self locking action serving to resist unscrewing rotation of the element from the carrier part after its installation. To accomplish these results, the external threads are shaped to form circularly spaced peak portions of the threads, and intermediate reduced diameter areas between the peaks, so that these peaked threads may deform the material of the carrier part to the desired thread configuration during advancement of the element into the unthreaded bore, and with the deformation being of a character enabling the peaks to resist unscrewing of the element after installation.

The elements as disclosed in my above identified patent can be manufactured effectively only by a machining process, and are not capable of being readily cast or forged because of the alternately peaked and recessed configuration of the threads. A major object of the present invention is to provide a new thread configuration which will function in a manner basically similar to that of the elements of my prior patent, and whose threads have a generally similar peaked shape, but which are especially adapted for easy and effective formation by either a casting operation or a forging operation, and may therefore be manufactured much more cheaply than the prior machined product. This cast or forged element is found especially useful for employment in carrier parts formed of a resinous plastic material or the like.

To define in greater detail the configuration of the external threads employed in my present invention, these threads, as in the prior patented arrangement, are truncated by outer surfaces which alternately advance radially inwardly and radially outwardly in a manner forming a series of circularly successive peaks on the threads, and intermediate reduced radius portions, as discussed above. At some of the minimum radius locations, there are formed areas between successive peaks which are recessed radially inwardly beyond a plane drawn to just touch the two adjacent peaks. As taught in my prior patent such inward recessing of the minimum radius areas assists in maximizing the self-tapping and self-locking characteristics of the element.

In accordance with my present invention, there is at least one of the minimum radius locations, and preferably two such locations, at which there is no actual inward recessing beyond a plane drawn to just touch the two adjacent peaks. The parting line for the casting or forging dies may then be received at approximately the location of these unrecessed minimum radius areas, since the avoidance of a recessed condition prevents the development at those locations of an undercut condition relative to the dies. Desirably, there are formed at these unrecessed areas approximately planar or flat surfaces extending between the two adjacent peaks, which surfaces may, as will appear, extend approximately as near to the axis of the device as do the recessed areas, in spite of the lack of recessing at the specified locations.

The above and other features and objects of the invention will be better understood from the following detailed description of the typical embodiment illustrated in the accompanying drawing, in which:

FIG. 1 is a partially elevational and partly axial sectional view of a threaded insert constructed in accordance with the invention, with the insert being shown in its installed position within a carrier part;

FIG. 2 is an enlarged end view of the insert taken on line 2—2 of FIG. 1, but without showing the carrier part;

FIG. 3 is a fragmentary axial section taken on line 3—3 of FIG. 2;

FIG. 4 is a transverse section through a die assembly for die casting the device of FIGS. 1 to 3; and FIG. 5 is a reduced view taken on line 5—5 of FIG. 4.

With reference to FIG. 1, I have illustrated at 10 a threaded insert constructed in accordance with the invention, and illustrated as it appears when fully installed within a carrier part 11. This carrier part is initially formed with an unthreaded straight cylindrical bore or passage 12 extending into the material of the carrier part from its outer typically planar surface 13, and with the bore 12 centered about an axis 14 disposed perpendicular to surface 13. An annular tapering countersink surface 15 may be provided at the outer end of the bore 12.

Insert 10 has a generally tubular body 16 carrying an external thread 17 which functions to tap an internal thread 18 in the wall of bore 12 as the insert is screwed into the carrier part. Internally, body 16 of the insert has a second set of threads, into which there may be screwed an externally threaded stud or bolt, to thus connect the bolt to the carrier part through the medium of the insert.

External thread 17 extends helically about and along the outer surface of the insert body, with modified minor diameter surfaces 19 being formed between successive turns of thread 17. Minor diameter surfaces 19 are desirably cylindrical and centered about axis 14, and have an axial extent 117 between successive turns of thread 17 which is substantially greater than the axial extent 217 of thread 17 at its maximum diameter crest area, and preferably is at least about as great as the axial extent 317 of each turn of thread 17 at its thickest or root area.

Thread 17 may be considered as having an axial sectional profile (left side of FIG. 1) which is uniform along the entire helical extent of the thread, except insofar as the thread is truncated in two respects. In the first place, thread 17 is truncated by an outer surface or series of surfaces 20 (FIG. 1) which wave radially inwardly and outwardly to form the peripheral outline illustrated in the end view of FIG. 2. Secondly, the thread 17 is further truncated at its two opposite ends by tapering chamfer surfaces 21' and 22.

With reference first to the outline configuration produced by the FIG. 2 waving pattern of outer surface or surfaces 20, it is noted that surfaces 20 face radially outwardly away from axis 14, and wave radially in a manner forming a series of circularly successive maximum diameter points 21, 22, 23, 24, 25, and 26, and a series of intermediate minimum radius portions 27, 28, 29, 30, 31, and 32. Two of the peaks, in particular numbers 23 and 26, may have shapes corresponding very closely to the peaks formed on certain of the devices of my above discussed prior patent. More specifically, with regard to peak 23, it is noted that as surface 20 advances from the minimum radius location 28 to maximum radius location 23, and then continues on to the next successive minimum radius location 29, surface 20 preferably changes continuously in radius, desirably with a continuously curving outwardly convex configuration. Stated differently, the radial distance to surface 20 from main axis 14 preferably changes continuously, but at a rate which progressively decreases from near location 28 to point 23, and then progressively increases to near location 29. Optimally, surface 20 follows an arcuate or circularly curving path, centered about the point designated 123 in FIG. 2, from a point near location 28 to a point near location 29. The radius of curvature $r$ of this arc should be equal to at least about 40% of the radial distance from axis 14 to peak location 23, and preferably approximately 50%. At the locations 28 and 29, surface 20 may have a reverse arcuate curvature of a much smaller radius, as shown.

The curvature in advancing from maximum radius location 22 to minimum radius location 28 may be the same as that between maximum radius location 23 and minimum radius location 29. Further, the curvature between points 29 and 24 may be the same as between points 28 and 23. As a result, the minimum radius region 28 is recessed radially inwardly beyond a plane 33 which is drawn to just touch or be tangent to the two adjacent peaks. Minimum radius location 29 is similarly recessed inwardly beyond a plane drawn to just touch its two adjacent peaks.

At the opposite or left hand side of FIG. 2, the configuration of the peaks and recesses between the locations 21 and 25 is the same as has been discussed for the region between points 22 and 24 at the right side of FIG. 2, so that the two minimum radius regions 31 and 32 are also recessed radially inwardly beyond planes such as plane 33 which are drawn to just touch the two adjacent peaks. This inward recessing of the locations 28, 29, 31 and 32 gives to the insert an extremely effective self tapping and self locking action.

At the top of FIG. 2, there is illustrated in broken lines at 34 the shape which this portion of the insert would assume if the recessed outline configuration found at the right and left sides of the insert were to continue at this upper location. Instead of this shape, however, the surfaces 20 at the top of FIG. 2 are given a flat or planar configuration, to lie essentially within a plane 35 which extends parallel to main axis 14 and perpendicular to a radial line 36 extending from that axis to the minimum radius location 27. At the opposite ends of this flat 37, surface 20 may be rounded slightly at 38 and 39, to blend smoothly into the rounded peak areas at maximum radius locations 21 and 22. Minimum radius location 27 is desirably located to be at least about as close to axis 14 as are the recessed areas 28, 29, 31 and 32, and preferably is slightly closer to the axis, as will be apparent from FIG. 2.

At the diametrically opposite side of body 16, the surface or surfaces 20 form additional flats or planar surfaces 40, which extend parallel to axis 14 and to the previously mentioned flats 37, and which reach a minimum radius location 30 corresponding to location 27 at the top of FIG. 2.

This discussed outline configuration of the various peaks and intermediate minimum radius locations, as illustrated in FIG. 2, is the same for all of the various turns of external thread 17, except insofar as the end turns are further truncated by the tapering chamfer surfaces 21 and 22. These chamfers are desirably of circular cross section, and should taper at a relatively gradual angle $a$ with respect to axis 14, that angle preferably being not greater than about 30 degrees, and for best results approximately 20 degrees.

With further reference to the cross sectional profile of the individual turns of thread 17, as seen in the left portion of FIG. 1, it is noted that the included angle $b$ between opposite sides of each turn is desirably substantially less than the usual 60 degree included angle, is preferably even less than 50 degrees, and for best results is approximately 40 degrees.

FIG. 4 shows a die assembly for die casting the part illustrated in FIGS. 1 to 3, and consisting of two die halves 41 and 42 and a central core 43. The die halves 41 and 42 are carried by and actuable by appropriate die holding structures 44 and 45, and have a parting line represented by the plane 46 of FIG. 4. Zinc alloy or other die casting material is injected into the cavity 47 formed by the two dies through an inlet line 48 which communicates with gate passages 49 extending into the cavity. Similar vent passages 50 are provided at the opposite side of the dies, with the gate and die passages 49 and 50 being located at the parting line 46.

Cavity 47 in the two die halves is so shaped as to give to the outside of insert body 16 the peaked thread configuration which has been discussed above. This cavity is so located relative to the dies that the first surfaces 51 and 52 which form the flats 37 and 40 of the insert thread extend perpendicular to the parting line or plane 46, and are located 50 percent in one of the die halves and 50 percent in the other. Also, the axis 14 of the element being formed desirably lies in the parting plane 46. Core 43 is externally cylindrical and unthreaded, to initially form an unthreaded bore in the insert, which bore is tapped after the casting operation to machine threads therein. Core 43 may move axially into cavity 47 along an axis 53 which coincides with axis 14 of the formed part.

As seen in FIG. 5, the gate passages 49 and vent passages 50 preferably extend axially along the major portion of the axial extent of the insert being formed, and thus extend through and intersect a series of the turns of thread 17 at the minimum radius locations 27 and 30 of FIG. 2.

In casting the element within the apparatus of FIGS. 4 and 5, zinc alloy or the like is injected in melted form and under pressure into the cavity 47, and about core 43, to be forced into thread shaped grooves provided in the dies for forming thread 17 to the discussed doubly truncated configuration. After the casting operation, die halves 41 and 42 may be separated from one another, along the line indicated by arrows 54 and 55 of FIG. 4, with such separation being permitted by virtue of the flats provided at 51 and 52.

Any small flashing which may remain on the insert at the parting line, that is, at the location of gate 49 and vent 50, is positioned at one of the minimum radius locations 27 or 30, and does not interfere substantially with the self-locking or self-tapping action of thread 17, since this flashing cannot alter the highly critical cross sectional configuration of the thread at and near the peak areas.

Instead of the completely flat configuration of surfaces 37 and 40, these surfaces may have a very slight draft, to facilitate removal of the insert from the die halves. That is, surface 37 may advance very gradually upwardly as it advances from the locations 38 and 39 to the central area 27 of FIG. 2. However, this draft if present at all is desirably so slight as to be virtually imperceptible in a view such as that illustrated in FIG. 2, and therefore no attempt has been made to show the draft condition. It is considered that within the terminology of the present application, surfaces 37 and 40 are to be considered as substantially planar even if given a slight draft configuration of the discussed type.

In using the insert, it is sumultaneously turned about axis 14 of FIG. 1 and advanced downwardly along that axis so that the alternate peaks and recesses formed by outer surface 20 of thread 17 act to progressively shape mating threads 18 in carrier part 11. When the insert reaches its FIG. 1 fully installed position, the resilience of the carrier part material tends to cause that material to return very slightly inwardly at locations circularly behind and about the various peaks of thread 17, to in this way effectively resist unscrewing rotation and give to the insert a self-locking action.

I claim:

1. An element comprising a body having external self tapping threads disposed about an axis and adapted to be screwed into a carrier member, said external threads having radially outer surfaces which define radially outwardly projecting circularly spaced peaks, and which, in advancing circularly between successive peaks, first advance progressively radially inwardly relative to said axis to predetermined minimum radius regions, and then advance radially outwardly relative to the axis to the next successive peak in a relation giving to the threads a self-tapping characteristic, said outer surfaces of the threads having portions at two diametrically opposite sides of the element which extend between successive peaks and are approximately planar and approximately parallel to one another and which extend approximately along two planes drawn to just touch adjacent peaks, said radially outer surfaces of the threads having additional portions extending circularly between said approximately planar portions and which in advancing radially inwardly from the peaks are of outwardly convex smoothly curving configuration and curve gradually and smoothly and progressively radially inwardly beyond planes drawn to just touch circularly successive peaks and in essential tangency to said last mentioned planes, said threads being chamfered at at least one end thereof.

2. An element as recited in claim 1, in which said element has two die parting lines extending axially through said approximately planar portions of said outer surfaces of the threads.

3. An element as recited in claim 1, in which said element has a second set of threads different than said external threads for engaging another member.

4. An element as recited in claim 1, in which said element is an insert containing internal threads of a diameter smaller than said external threads.

5. An element as recited in claim 1, in which said element has modified minor diameter surfaces axially between successive turns of said external threads and of an axial extent greater than the minimum axial thickness of the threads at their crests.

6. An element as recited in claim 1, in which said approximately planar portions of said outer surfaces reach a minimum radius which is at least about as near to said axis as is the minimum radius between successive ones of said outwardly convexly curved portions of said surfaces.

7. An element as recited in claim 1, in which said element has two die parting lines extending axially through said approximately planar portions of said outer surfaces of the threads, said element being an insert containing internal threads of a diameter smaller than said external threads, said external threads being chamfered essentially annularly at both ends of the insert, said element having external modified minor diameter surfaces axially between successive turns of said external threads and of an axial extent greater than the minimum axial thickness of the external threads at their crests, said approximately planar portions of said outer surfaces reaching a minimum radius which is at least about as near to said axis as is the minimum radius between successive ones of said outwardly convexly curved portions of said surfaces.

8. An element comprising a body having external self tapping threads disposed about an axis and adapted to be screwed into a carrier member, said external threads having radially outer surfaces which define radially outwardly projecting circularly spaced peaks, and which, in advancing circularly between successive peaks, first advance progressively radially inwardly relative to said axis to predetermined minimum radius regions, and then advance radially outwardly relative to the axis to the next successive peak in a relation giving to the threads a self-tapping characteristic, said outer surfaces of the threads having portions at two diametrically opposite sides of the element which extend between successive peaks and are approximtaely planar and approximately parallel to one another and which extend approximately along two planes drawn to just touch adjacent peaks, said radially outer surfaces of the threads having additional portions extending circularly between said approximately planar portions and which in advancing radially inwardly from the peaks advance gradually and smoothly and progressively radially inwardly beyond planes drawn to just touch circularly successive peaks, said threads being chamfered at at least one end thereof.

References Cited

UNITED STATES PATENTS

| 3,159,074 | 12/1964 | Neuschotz | 85—47 |
| 3,200,691 | 8/1965 | Neuschotz | 85—47 |
| 3,202,195 | 8/1965 | Neuschotz | 85—47 |

FOREIGN PATENTS

| 286,968 | 2/1965 | Netherlands. |

MARION PARSONS, JR., *Primary Examiner.*